(12) United States Patent
Passebecq et al.

(10) Patent No.: US 6,685,260 B1
(45) Date of Patent: Feb. 3, 2004

(54) VEHICLE FRONT INTERIOR CROSS MEMBER

(75) Inventors: Ghislain Passebecq, Trappes (FR); Jean Dauvergne, Trappes (FR)

(73) Assignees: Valeo, Paris (FR); Visteon Systems Interieurs, La Defense Cedex (FR)

( * ) Notice: Subject to any disclaimer, the term of this patent is extended or adjusted under 35 U.S.C. 154(b) by 0 days.

(21) Appl. No.: 10/019,490

(22) PCT Filed: Jun. 30, 2000

(86) PCT No.: PCT/FR00/01845

§ 371 (c)(1), (2), (4) Date: May 30, 2002

(87) PCT Pub. No.: WO01/02232

PCT Pub. Date: Jan. 11, 2001

(30) Foreign Application Priority Data

Jun. 30, 1999 (FR) .............................. 99 08733

(51) Int. Cl.[7] .............................................. B60R 27/00
(52) U.S. Cl. ............................ 296/208; 296/70; 180/90
(58) Field of Search ................................. 296/192, 208, 296/70; 180/90

(56) References Cited

U.S. PATENT DOCUMENTS

| | | | | |
|---|---|---|---|---|
| 3,635,305 A | * | 1/1972 | Kunishi et al. | 180/90 |
| 5,354,114 A | | 10/1994 | Kelman et al. | |
| 5,673,964 A | * | 10/1997 | Roan et al. | 296/208 |
| 6,110,037 A | * | 8/2000 | Yoshinaka | 296/208 |
| 6,186,887 B1 | * | 2/2001 | Dauvergne | 296/208 |

FOREIGN PATENT DOCUMENTS

| | | |
|---|---|---|
| DE | 42 32 846 A1 | 3/1994 |
| EP | 0 456 531 A1 | 11/1991 |

* cited by examiner

Primary Examiner—Joseph D. Pape
Assistant Examiner—Lori L Coletta
(74) Attorney, Agent, or Firm—Young & Thompson

(57) ABSTRACT

An interior, in particular front, cross member (10) of a vehicle for circulating an air stream and fixing equipment items of the vehicle. The cross member is provided by an extruded profile (10) defining at least an air flow conduit (11, 12) and zones (13, 14, 15) of extra thickness for fixing the equipment items.

13 Claims, 2 Drawing Sheets

VEHICLE FRONT INTERIOR CROSS MEMBER

FIELD OF THE INVENTION

The present invention relates to an internal crosspiece, especially a front crosspiece, of a vehicle.

BACKGROUND OF THE INVENTION

The invention finds an advantageous application to all types of vehicles, whether they are land, marine or airborne vehicles, and more especially to motor vehicles.

In a general way, motor vehicles are equipped with a front internal crosspiece, situated under the trim panel of the dashboard. This crosspiece fixed, at each end, to a pillar, constitutes a member for reinforcing the passenger compartment, able to resist the impacts possibly occurring upon an accident.

Furthermore, dashboards feature a large number of different pieces of equipment which are most often arranged independently of one another under the trim panel. This is the case especially for the components allowing air-conditioning within the vehicle. This results in the dashboard being heavy and taking up a great deal of the available space.

In order to remedy this drawback, it is known to provide a front internal crosspiece of tubular shape, able to constitute at least one duct for the circulation of an airflow for ventilation, heating and/or air-conditioning of the passenger compartment of the vehicle.

These known crosspieces also serve, in certain cases, as support for a certain number of equipment items and/or of interior fixtures of the vehicle, such as the steering column, pedal mechanism, instrumentation cluster, fuse box, airbag device, central consoles, etc.

To that end, the crosspiece is equipped with a plurality of fixing lugs onto which the various pieces of equipment are fastened. In practice, the crosspiece proper and the fixing lugs are produced by welding of tubes and of pieces of stamped sheet metal, or by moulding from magnesium, aluminum or composite fibre.

It should be noted, however, that the crosspiece thus described constitutes a complex component requiring tooling which is highly complex and therefore expensive.

SUMMARY OF THE INVENTION

Hence, the object of the present invention is to propose an internal crosspiece of a vehicle, especially a front crosspiece, which is intended at least to provide a fixing for items of equipment of the vehicle, and, if appropriate, circulation of airflow, a crosspiece which it should be possible to produce in a much more economical way without the various functionality aspects of the crosspiece thereby being affected.

The solution to the technical problem posed consists, according to the present invention, in that the crosspiece is formed by an extruded profiled section defining at least overthickness regions for fixing the equipment items.

According to one particular embodiment, as will be seen in detail later, the invention will make it possible, in a single extrusion operation, to produce both at least one air-circulation duct and regions of overthickness of material in which the piercings and tappings necessary for fixing the equipment items will be formed.

The present invention also relates to the characteristics which will emerge in the course of the description which will follow, and which should be considered in isolation or in all their technically possible combinations.

BRIEF DESCRIPTION OF THE DRAWINGS

This description, given by way of non-limiting example, will give a better understanding of how the invention can be implemented, by reference to the attached drawings in which.

DESCRIPTION OF THE PREFERRED EMBODIMENTS

Figure 1:
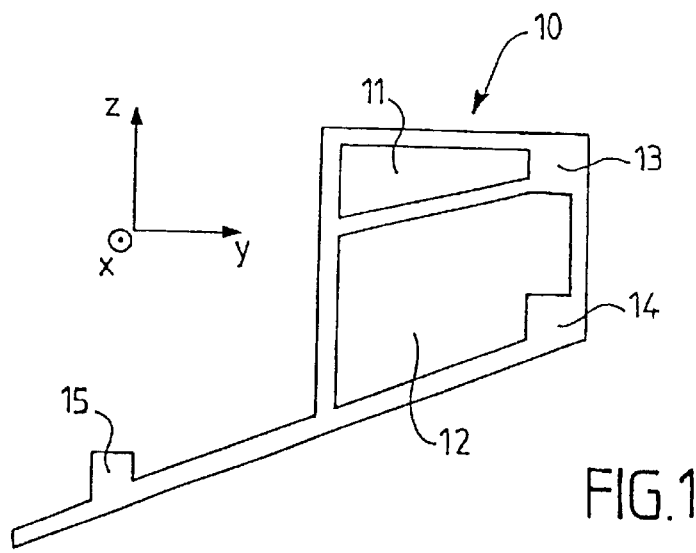
FIG. 1 is a profile view of a front internal crosspiece in accordance with the invention.
Figure 4:
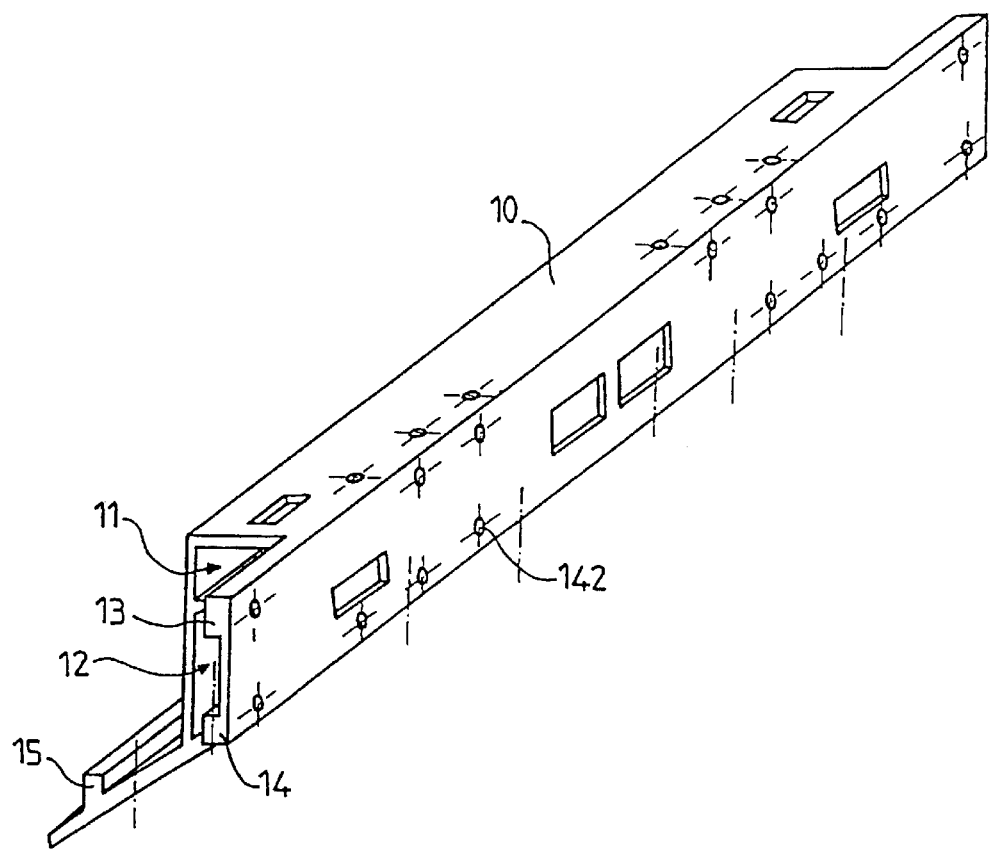
FIG. 4 is a view, in perspective, of an example crosspiece in accordance with the invention.

In FIGS. 1 and 4 is represented a front internal crosspiece 10, especially of a motor vehicle, intended to carry out at least a dual and possibly a triple function, namely to guarantee mechanical resistance against any impacts, to offer a support for the various pieces of equipment present in the area of the dashboard, steering column, inflatable airbags, central console, etc, and to allow an airflow circulation for ventilation, heating and/or air-conditioning of the passenger compartment of the vehicle.

FIG. 1 shows that, to that end, the crosspiece 10 is formed by an extruded profiled section defining regions 13, 14, 15 of overthickness for fixing the equipment and, for example, two airflow-circulation ducts 11, 12.

The equipment element or elements in question are, naturally, outside the crosspiece and are affixed onto the outer faces thereof.

The material used for the extrusion of the profiled section 10 may be aluminum and/or a pultruded composite material.

Figures 2A, 2B:
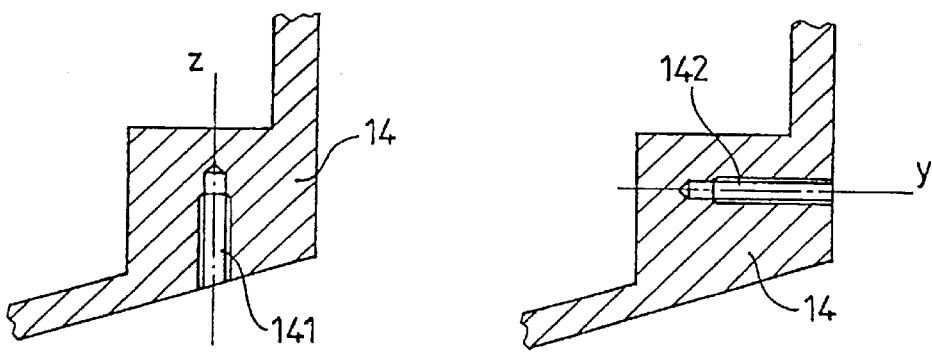
FIGS. 2a and 2b are partial sectional views of the crosspiece of FIG. 1.

The areas of overthickness, such as the area 14 of FIGS. 2a and 2b, can be pierced on their faces parallel to the x direction, and at appropriate locations, with holes 141, 142 the axes y, z of which are in a plane transverse to the extrusion direction x. These holes 141, 142 are then tapped, especially in order to accommodate fixing screws.

Figure 3:
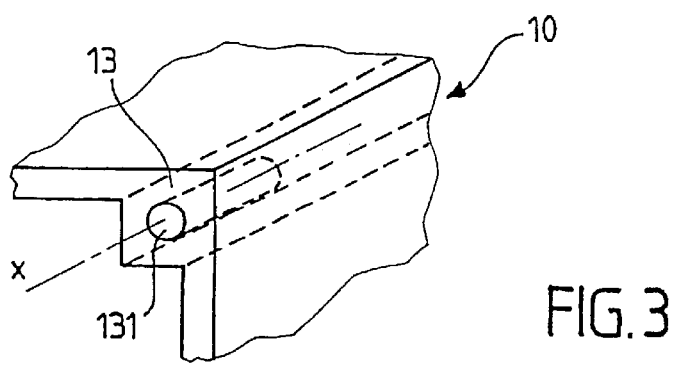
FIG. 3 is a partial view in perspective of the crosspiece of FIG. 1.

Some of the overthicknesses, such as the overthickness 13 of FIG. 3, can also be used to fix the crosspiece 10 to lateral pillars of the passenger compartment (not represented). For that purpose, tapped holes 131, for example, are pierced in the longitudinal direction x, at the end of the profiled section.

The holes 141, 142, 131 formed in the overthicknesses 13, 14, 15 are blind, for example.

Other implementations within the scope of the person skilled in the art could naturally be envisaged, without to any extent departing from the present invention.

What is claimed is:
1. Internal crosspiece of a vehicle, especially a front crosspiece, which is intended at least to provide a fixing for items of equipment of the vehicle, wherein said crosspiece is a single extruded profiled section defining at least regions of overthickness for fixing said equipment items.

2. The internal crosspiece according to claim 1, wherein said extruded profiled section further defines at least one airflow-circulation duct.

3. The internal crosspiece according to claim 1, wherein said regions of overthickness are able to provide for the fixing of said equipment items in a plane perpendicular to the profiled section.

4. The internal crosspiece according to claim 3, wherein said regions of overthickness are able to provide for the fixing of said crosspiece at an end of the profiled section.

5. The internal crosspiece according to claim 1, wherein said extruded profiled section is made of aluminum.

6. The internal crosspiece according to claim 1, wherein said extruded profiled section is made of pultruded composite material.

7. An internal crosspiece of a vehicle, comprising:

a single section having a constant profile and terminating in a flange section at each end, each flange section having at least one aperture therethrough, said single section having plural overthickness regions extending along an entirety of said single section, parallel to a longitudinal axis of said single section.

8. The internal crosspiece as claimed in claim 7, wherein said single section had a front face and a rear face, said flange section extending beyond each said end parallel to said front face.

9. The internal crosspiece as claimed in claim 8, further comprising an extension flange extending obliquely from said rear face, said extension flange comprising at least one of said plural overthickness regions.

10. The internal crosspiece as claimed in claim 7, wherein said single section defines at least one airflow circulation duct.

11. The internal crosspiece as claimed in claim 10, wherein at least two of said plural overthickness regions are in corners of said at least one airflow circulation duct.

12. The internal crosspiece as claimed in claim 7, wherein said plural overthickness regions have at least one aperture perpendicular to said longitudinal axis.

13. The internal crosspiece as claimed in claim 7, wherein one of said plural overthickness regions has an aperture parallel to said longitudinal axis, immediately adjacent each said end.

* * * * *